United States Patent [19]

Einhorn

[11] 4,322,194
[45] Mar. 30, 1982

[54] WALL ANCHOR WITH SELF-DRILLING CAPABILITY

[75] Inventor: Ruediger Einhorn, Katonah, N.Y.

[73] Assignee: Coats & Clark, Inc., Stamford, Conn.

[21] Appl. No.: 74,760

[22] Filed: Sep. 12, 1979

[51] Int. Cl.³ ............................................. F16B 13/06
[52] U.S. Cl. ........................................ 411/30; 411/57; 411/71
[58] Field of Search ............... 85/68, 83, 84, 72, 10 R, 85/19, 44, 41, 1 JP; 411/30, 29, 57, 71, 73, 44

[56] References Cited

U.S. PATENT DOCUMENTS

| 2,412,517 | 12/1946 | Klein | 85/30 X |
| 3,280,875 | 10/1966 | Fischer | 85/83 X |
| 3,431,813 | 3/1969 | Johnson | 85/84 X |
| 3,613,497 | 10/1971 | Heldermann | 85/84 |
| 3,703,120 | 11/1972 | Van Buren, Jr. | 85/83 |
| 4,085,651 | 4/1978 | Koscik | 85/84 X |

FOREIGN PATENT DOCUMENTS

| 162190 | 1/1949 | Austria | 85/84 |
| 560256 | 9/1932 | Fed. Rep. of Germany | 85/83 |
| 2504753 | 8/1975 | Fed. Rep. of Germany | 85/83 |
| 2550787 | 5/1977 | Fed. Rep. of Germany | 85/83 |
| 1302338 | 7/1962 | France | 85/83 |
| 451379 | 9/1949 | Italy | 85/84 |
| 1247193 | 9/1971 | United Kingdom | 85/84 |
| 1458289 | 12/1976 | United Kingdom | 85/84 |

*Primary Examiner*—Ramon S. Britts
*Attorney, Agent, or Firm*—Burgess, Ryan and Wayne

[57] ABSTRACT

A unitary hollow plastic screw anchor which is capable of being hammered or otherwise driven into a hollow wall, with a weakened separation plane adjacent the entrance portion which is sufficiently strong to hold together during installation in the wall, and sufficiently weak to split apart when a screw is inserted into the installed anchor. Features of the anchor include a generally cross-shaped entrance end for minimal penetration resistance, a generally rectangular interior with arcuate screw centering grooves, a single turn helix adjacent the wall-engaging flange thereof to start the screw, an internal step configuration to accommodate screws of varying diameter, and two longitudinal slots which compress during installation to further reduce penetration resistance.

1 Claim, 10 Drawing Figures

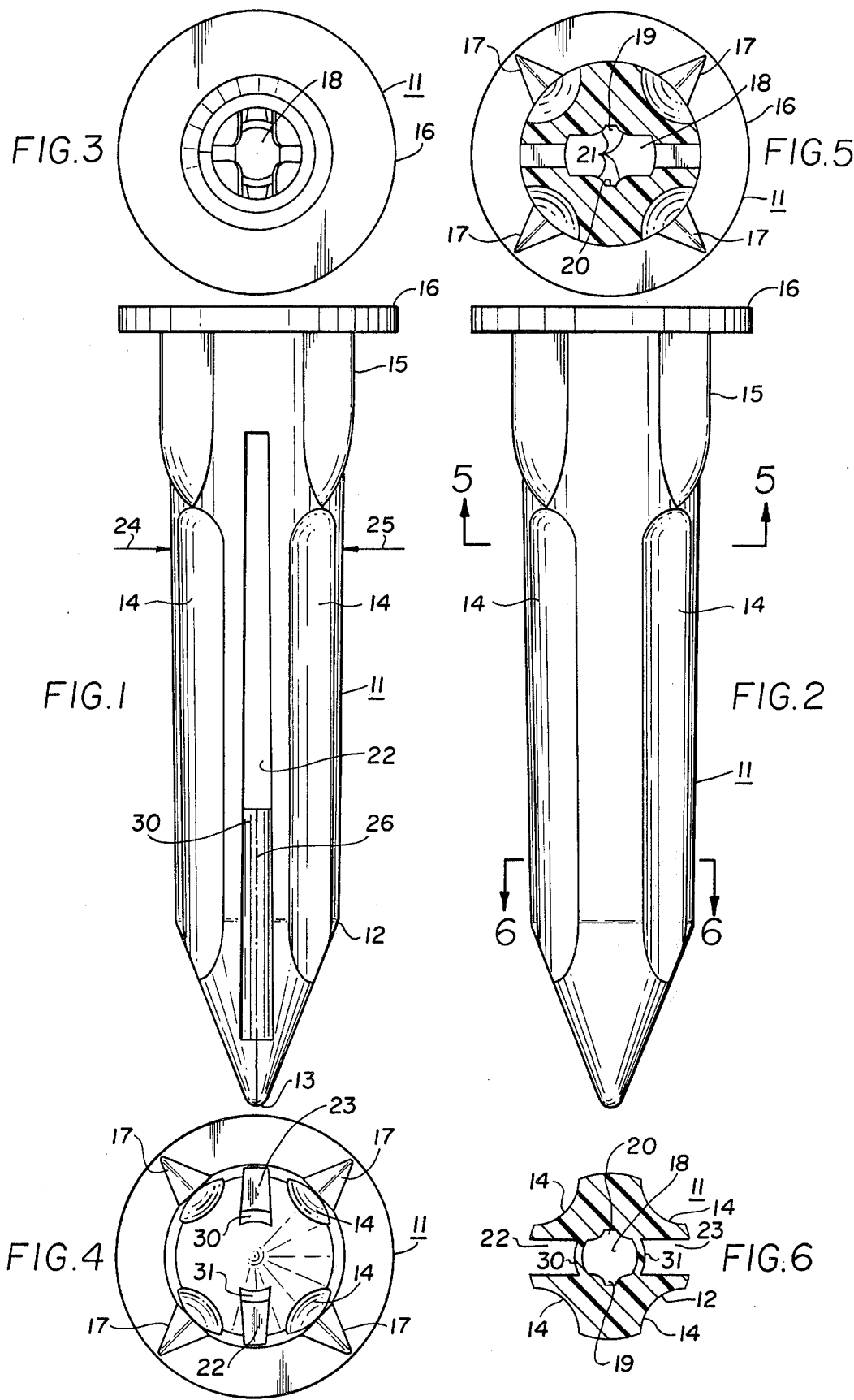

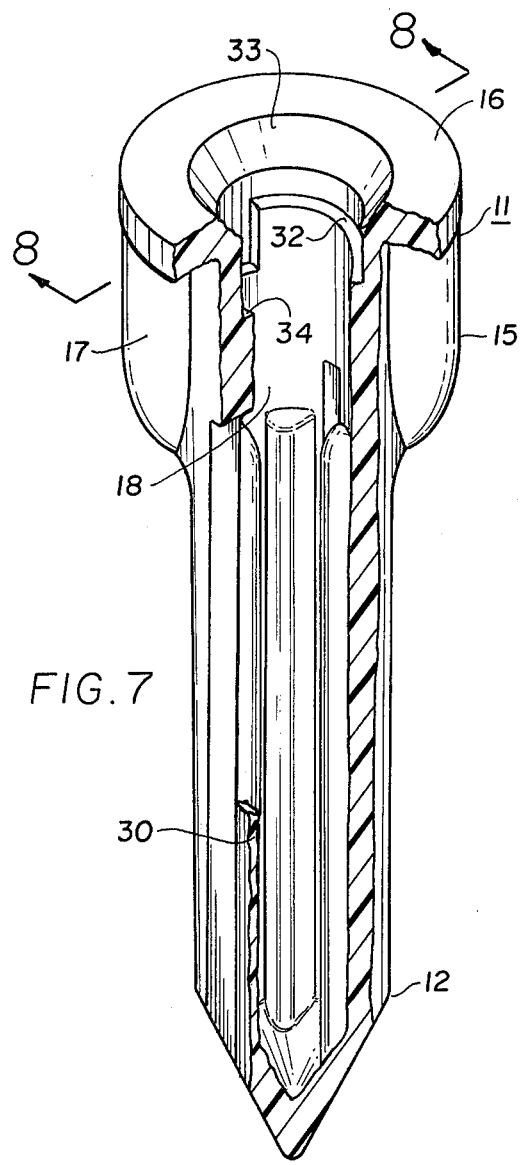
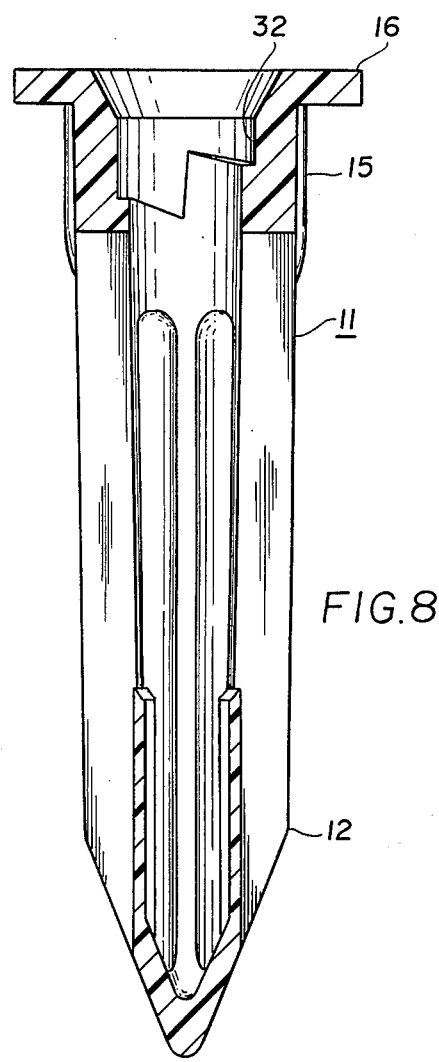
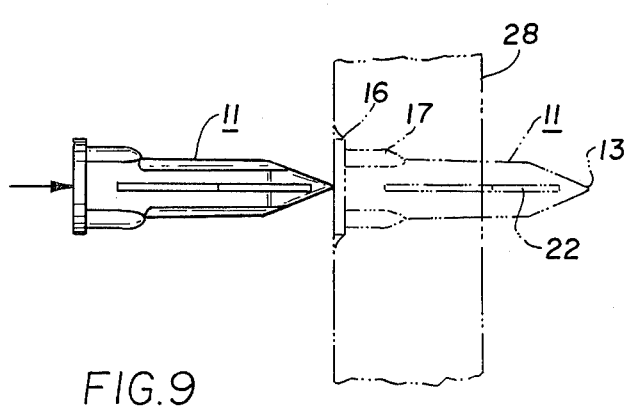
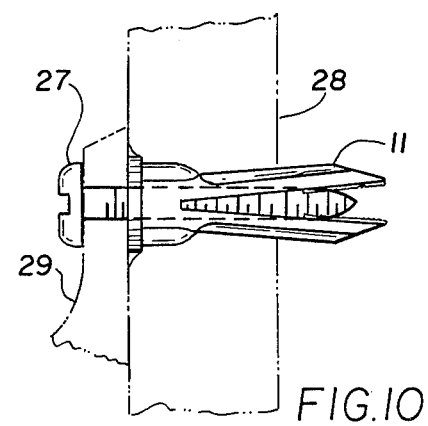

WALL ANCHOR WITH SELF-DRILLING CAPABILITY

This application relates to an improved wall anchor capable of installation in hollow walls without the need for pre-drilling the same.

Existing wall anchors are generally made of plastic, and are not capable of installation in a hollow wall by driving them into the wall, i.e., it is necessary to pre-drill a hole in the wall of slightly smaller diameter than the anchor, with the anchor then being pressed or hammered into the pre-drilled hole.

Accordingly, an object of the present invention is to provide an improved wall anchor which does not require a pre-drilled hole for installation in a hollow wall.

As herein described, there is provided a wall anchor, comprising a hollow elongated body having: an entrance end tapered to a point; rotation-preventing means adjacent the other end of said body; an internal longitudinal recess opening to said other end of said body; a longitudinal weakened separation plane adjacent said entrance end, said plane being strong enough to hold the anchor body together during installation and weak enough to be severed after installation, by expansion when an object supporting member is inserted into said recess; the external surface of said body having a relatively smooth taper in the longitudinal direction from said other end to said point.

IN THE DRAWINGS

FIG. 1 is a front elevation view of a wall anchor according to a preferred embodiment of the invention;

FIG. 2 is a side elevation view of said anchor;

FIG. 3 is a top plan view thereof;

FIG. 4 is a bottom plan view thereof;

FIG. 5 is a cross-sectional view thereof taken along the cutting plane 5—5 shown in FIG. 2;

FIG. 6 is a cross-sectional view thereof taken along the cutting plane 6—6 shown in FIG. 2;

FIG. 7 is a partially cutaway perspective view thereof;

FIG. 8 is a cross-sectional view thereof taken along the cutting plane 8—8 shown in FIG. 7;

FIG. 9 illustrates the self-drilling manner of installation of the anchor in a hollow wall; and FIG. 10 shows the configuration of the anchor after it has been severed along the weakened separation plane thereof by expansion due to insertion of a screw into the anchor recess.

As shown in FIG. 1, the wall anchor 11 comprises a unitary plastic body formed of a suitable injection molding material such as an engineering Plastic material such as nylon, ABS, acetal, etc., and having a generally cross-shaped entrance end 12 (best seen in FIG. 6), said entrance end being tapered to a rounded point 13, four longitudinal flutes 14 extending from the entrance end 12 to a rotation-preventing region 15, and a wall-engaging flange 16 at the end opposite the pointed end 13.

The rotation-preventing region 15 comprises four wedge-shaped fins 17 (see FIG. 5), each having a triangular cross-section, for preventing rotation of the anchor 11 after it is installed in a hollow wall, and when a screw is being turned to thread it into the longitudinal recess 18 (see FIGS. 3, 5 and 6), which has a generally rectangular cross-section.

The wall-engaging flange 16 has portions (best seen in FIG. 5) which are contiguous with the rearward ends of the fins 17, so that said fins tend to provide additional support for the flange 16.

The longitudinal recess 18 is open at the flange 16, receiving a screw or other object supporting member. As best seen in FIGS. 5 and 6, the recess 18 has internal arcuate centering grooves 19 and 20 in the longer sidewalls thereof, so that the "ribs" 21 support and provide centering for the mounting screw.

In order to reduce the penetration cross-section or penetration resistance of the anchor 11 into a hollow wall, two longitudinal slots 22 and 23 are provided in the front and rear thereof, each slot extending between the entrance end 12 and the rotation-preventing region 15. When the anchor is hammered or otherwise urged into a hollow wall, penetration resistance is reduced by compression of the anchor material to partially close the slots 22 and 23, thus also providing a shock absorption effect.

The anchor 11 is preferably manufactured by injection molding, and is molded in such a manner that molten plastic material is caused to flow into the cavity defining the anchor 11, through two oppositely positioned gates, in directions indicated by the arrows 24 and 25 in FIG. 1. These plastic flows are balanced so that they meet along the central plane 26, thus forming a "cold flow seamline" or weakened separation plane thereat, due to the fact that the plastic material has cooled slightly by the time it reaches said plane 26, and also due to the meeting of the opposite directions of flow at said plane.

The weakened separation plane 26 is sufficiently strong to hold the left and right sides of the anchor 11 together during the installation process, i.e., while the anchor is being driven into a hollow wall (without providing a pre-drilled hole therefor), sufficiently weak so that when an object-supporting screw 27 (see FIG. 10) is inserted into the installed anchor, the plane 26 is severed, causing the left and right sides of the entrance end 12 to split apart, thus providing a wedging effect which prevents removal of the anchor 11 from the hollow wall 28 (FIG. 10), and providing firm support for the object 29 which is secured to the wall by the screw 27.

Webs 30 and 31 extend across the forward portions of the slots 22 and 23 respectively, to slightly reinforce the weakened separation plane 26. These webs are best seen in FIGS. 1 and 6.

A single turn helix 32 is formed adjacent the counter sunk end 33 of the longitudinal recess 18, to provide a single thread for starting of the screw 27.

A shoulder 34 is formed in the internal wall of the recess 18, so that said recess has a relatively large diameter above the shoulder and a relatively small diameter below the shoulder, for accommodating screws of varying diameter. Since the diameter of the recess 18 effectively decreases again at the point where the flutes 14 start, the anchor 11 is capable of accommodating screws of three different diameters. Recess 18 also decreases towards point 13 in size to accommodate different screw sizes.

As is evident from FIGS. 1 and 2, the body 11 has an external surface with a relatively smooth taper in the longitudinal direction from the flange 16 to the point 13, i.e., smooth along any given longitudinal line, or minimizing resistant to penetration.

Preferably, the peripheral surface of the anchor 11 should have a taper of approximately one degree from the entrance end 12 to the region where the flutes 14 and fins 15 meet. The included angle of the conical tapered portion between the point 13 and the entrance end 12, should preferably be about 22°, with the radius of the point 13 being about 0.010 inch and the diameter of the entrance end 12 being about 0.175 inch.

The diameter of the region where the flutes 14 end adjacent the fins 15, is about 0.200 inch, and the diameter of the flange 16 is about 0.312 inch.

The fins 17 preferably have a 45° included angle, which makes the fins strong yet with low wall penetration resistance.

The flange 16 has a thickness on the order of 0.024 inch which (in conjunction with reinforcement by the adjacent ends of the fins 17) is sufficiently strong to prevent it from cracking, while allowing the flange to remain sufficiently thin so that it does not protrude out from the wall too far, and thereby maintains an aesthetically pleasing appearance.

The effective internal diameters of the recess 18 are 0.175, 0.128 and 0.100 inches (reducing into smaller diameters adjacent the entrance end 12), for accommodating screw sizes No. 8, No. 6 and No. 4 respectively.

What is claimed is:

1. A wall anchor, comprising a hollow elongated body having:
   (a) a generally cross-shaped entrance end tapered to a rounded point;
   (b) a plurality of longitudinal flutes extending from the entrance end to a rotation-preventing region;
   (c) a plurality of wedge-shaped fins having triangular cross-section in the rotation-preventing region of the anchor;
   (d) a wall-engaging flange having peripheral portions contiguous with the rearward ends of the fins;
   (e) an internal longitudinal recess having a generally rectangular cross-section with longer and shorter sidewalls, and internal longitudinal arcuate centering grooves in the centers of the longer sidewalls;
   (f) at least two longitudinal slots extending between the entrance end and the fins;
   (g) a longitudinal weakened separation plane strong enough to hold the anchor body together during installation in a hollow wall and weak enough to be severed after installation, by expansion of the anchor body when an object supporting member is inserted into said recess;
   (h) a single turn helix formed in the wall of said recess adjacent said flange;
   (i) at least one internal shoulder in the wall of said recess defining a relatively large diameter recess portion adjacent said flange and a relatively small diameter recess portion remote from said flange; and
   (j) the external surface of said body having a relatively smooth taper in the longitudinal direction from said flange to said point.

* * * * *